United States Patent [19]

Suzuki

[11] Patent Number: 5,663,823
[45] Date of Patent: Sep. 2, 1997

[54] OPTICAL TRANSMISSION SYSTEM, OPTICAL TRANSMISSION MODULE, AND AN OPTICAL MODULATOR

[75] Inventor: Nobuo Suzuki, Tokyo, Japan

[73] Assignee: Kabushiki Kaisha Toshiba, Kawasaki, Japan

[21] Appl. No.: 644,817

[22] Filed: May 10, 1996

[30] Foreign Application Priority Data

May 16, 1995 [JP] Japan .................................. 7-117456

[51] Int. Cl.⁶ .................................................. H04B 10/04
[52] U.S. Cl. ........................ 359/181; 359/264; 359/276; 359/279
[58] Field of Search ........................... 359/182, 181, 359/183, 184, 185, 186, 264, 276, 279

[56] References Cited

U.S. PATENT DOCUMENTS

| | | | |
|---|---|---|---|
| 5,508,845 | 4/1996 | Frisken | 359/161 |
| 5,515,196 | 5/1996 | Kitajima et al. | 359/180 |
| 5,521,738 | 5/1996 | Froberg et al. | 359/184 |

OTHER PUBLICATIONS

IEEE Photonics Technology Letters, vol. 3, No. 10, pp. 916–918; A. H. Gnauck et al.; Oct. 1991, "Dispersion Penalty Reduction Using An Optical Modulator With Adjustable Chirp.".

*Primary Examiner*—Mark Hellner
*Attorney, Agent, or Firm*—Oblon, Spivak, McClelland, Maier & Neustadt, P.C.

[57] ABSTRACT

An optical transmission system comprises an optical transmitter for transmitting an optical signal, comprising an optical modulator for modulating a intensity of the optical signal in accordance with a binary digital NRZ (nonreturn-to-zero) electric signal and outputting a transmission optical signal, and means for supplying the electric signal and thereby driving the optical modulator, the means including means for adjusting a waveform of the electric signal supplied to the optical modulator so that a timing with which the optical signal outputted from the optical modulator transits from a high level to a low level is later than a timing with which the optical signal transits from the low level to the high level, an optical fiber with wavelength dispersion for propagating the signal light transmitted from the optical transmitter, and an optical receiver for receiving the optical signal propagated along the optical fiber and reconstituting an electric signal from the optical signal.

19 Claims, 11 Drawing Sheets

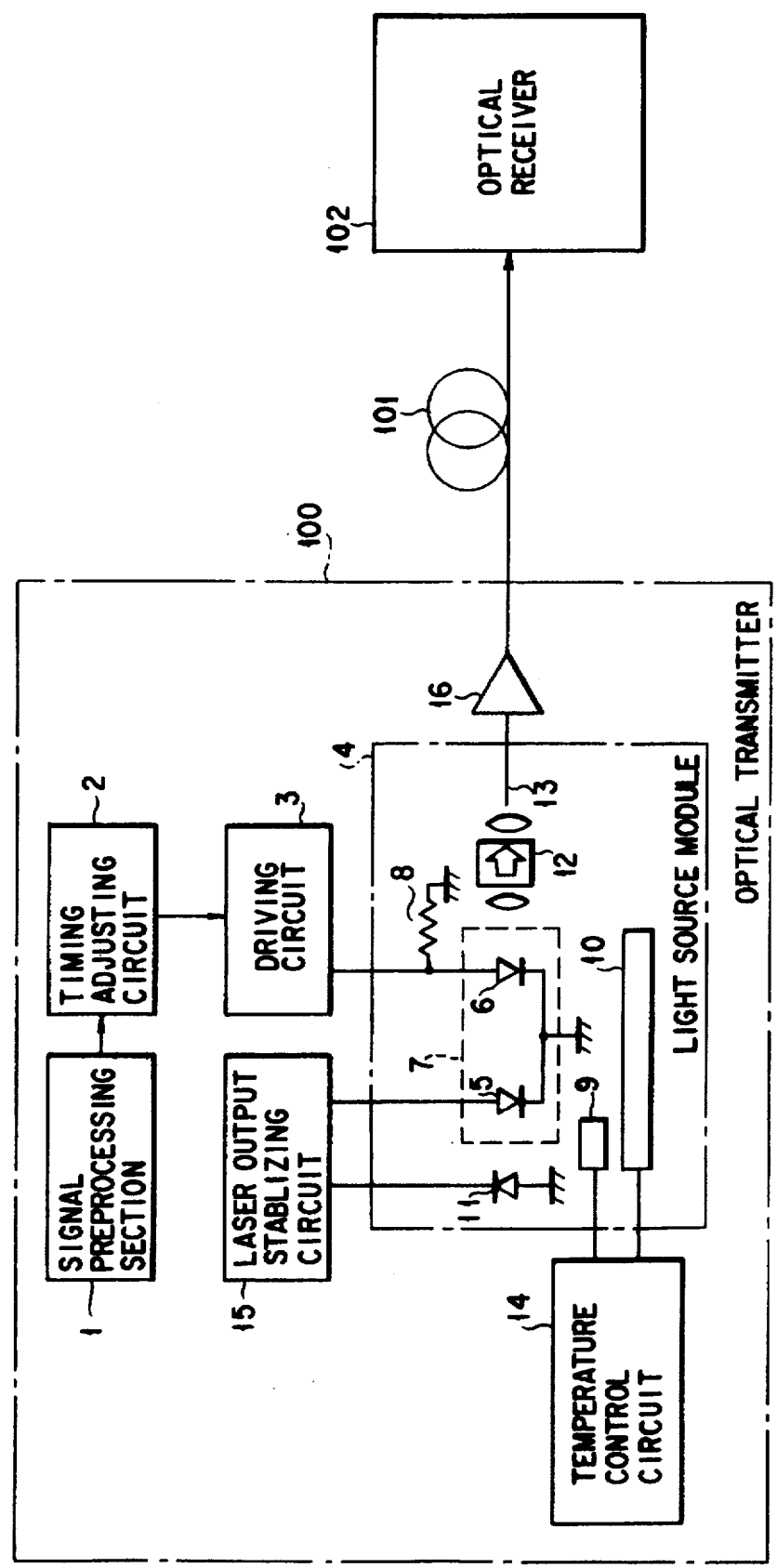
F I G. 1

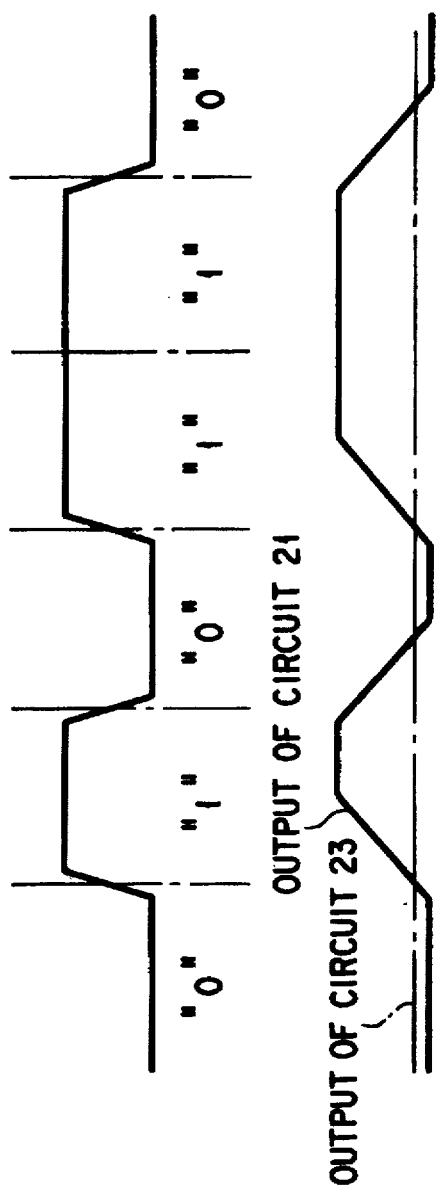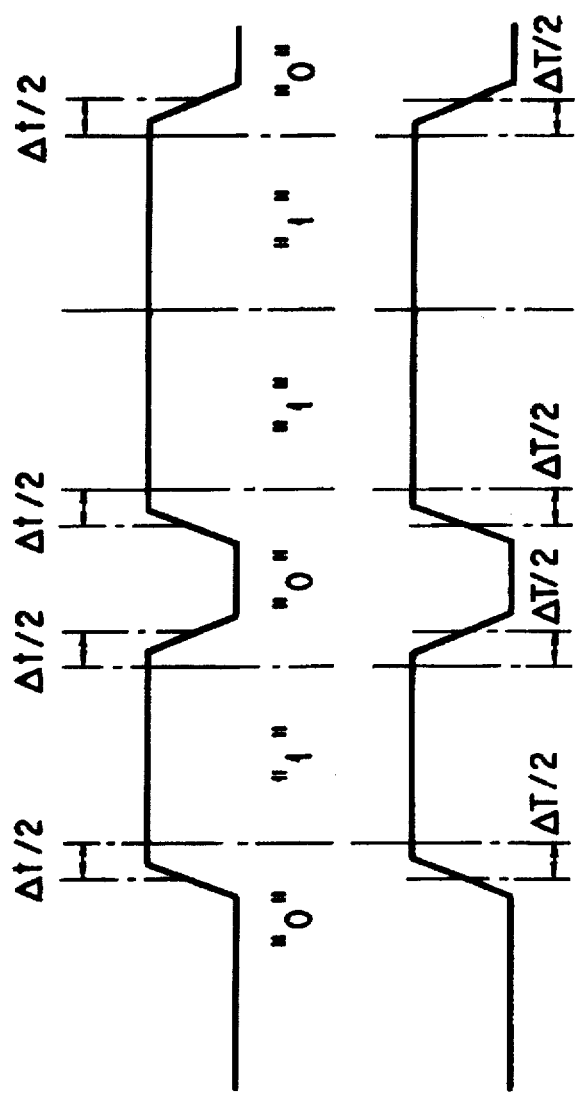
FIG. 3A
FIG. 3B
FIG. 3C
FIG. 3D

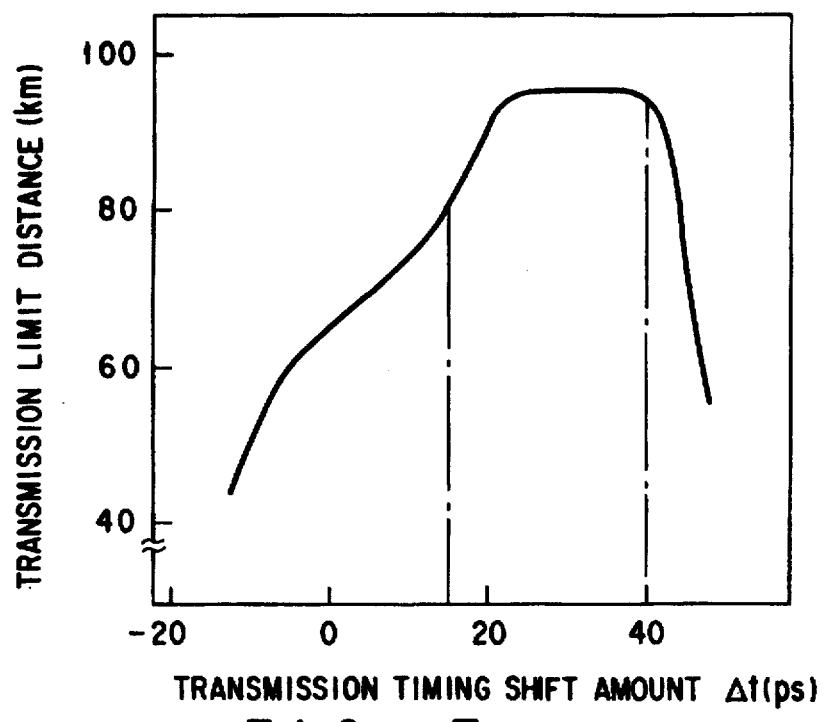
F I G. 7
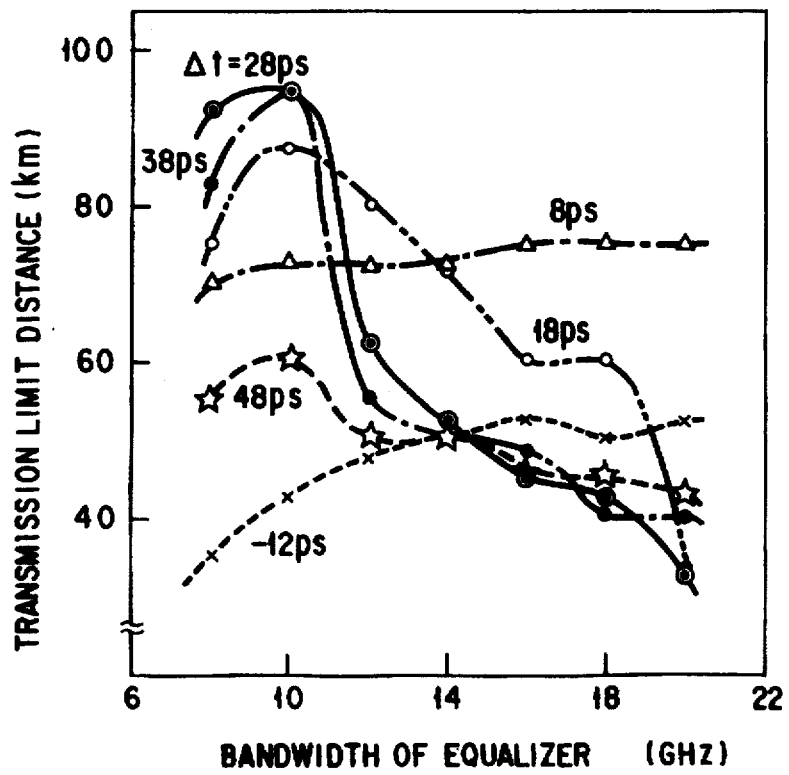
F I G. 8

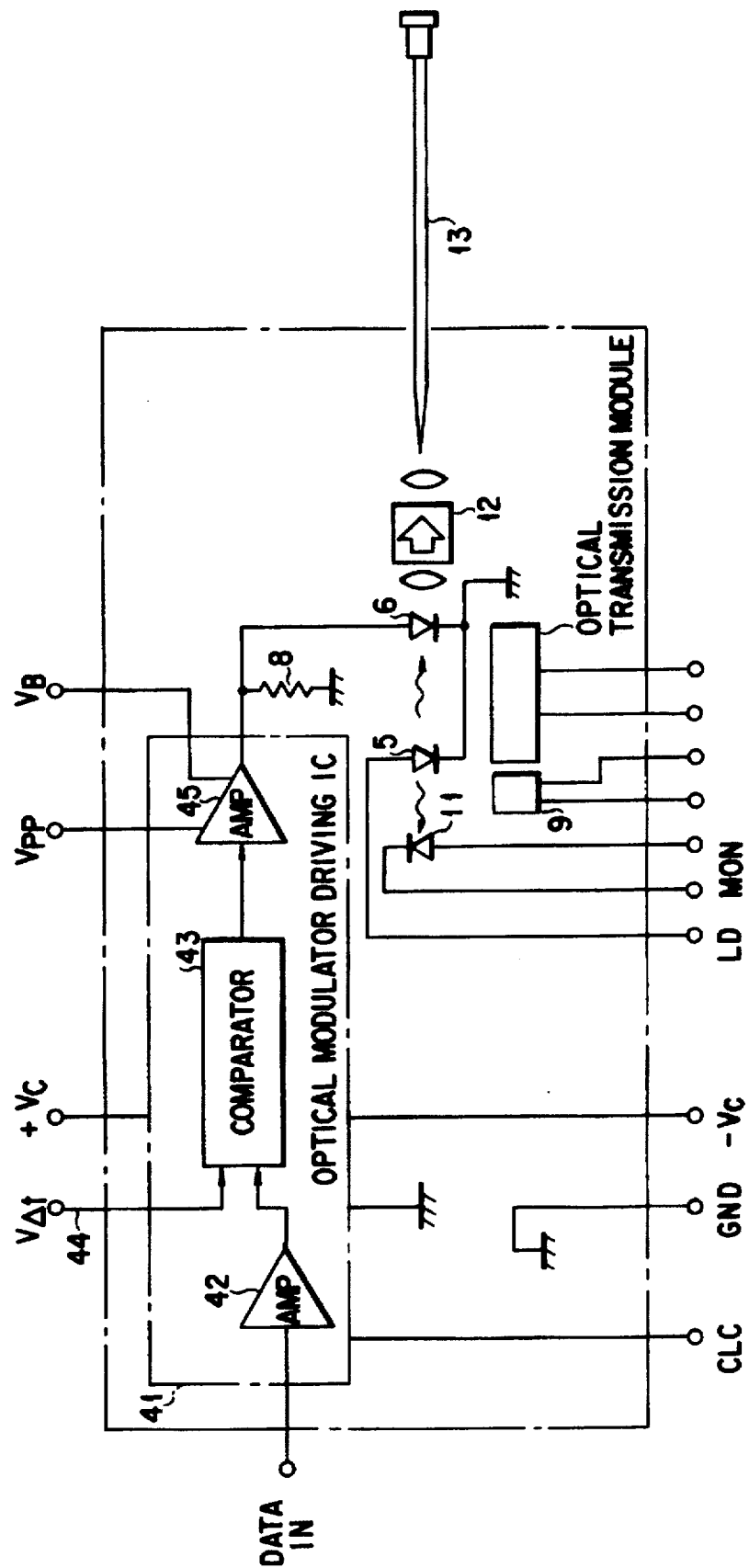
F I G. 10

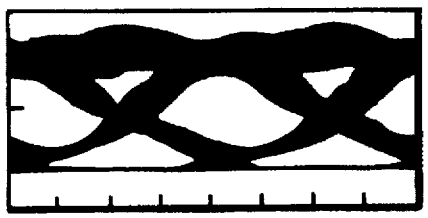
F I G. 11A
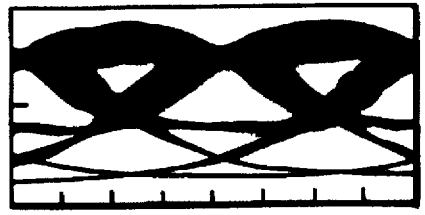
F I G. 11B
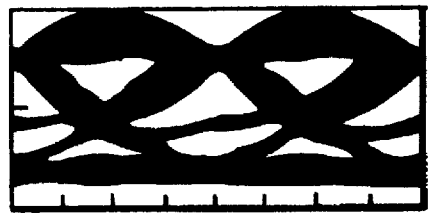
F I G. 11C
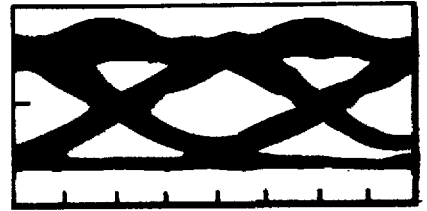
F I G. 11D
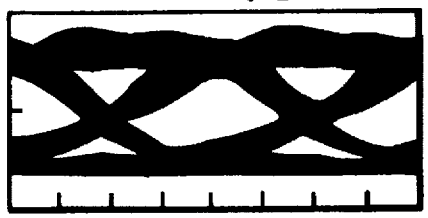
F I G. 11E

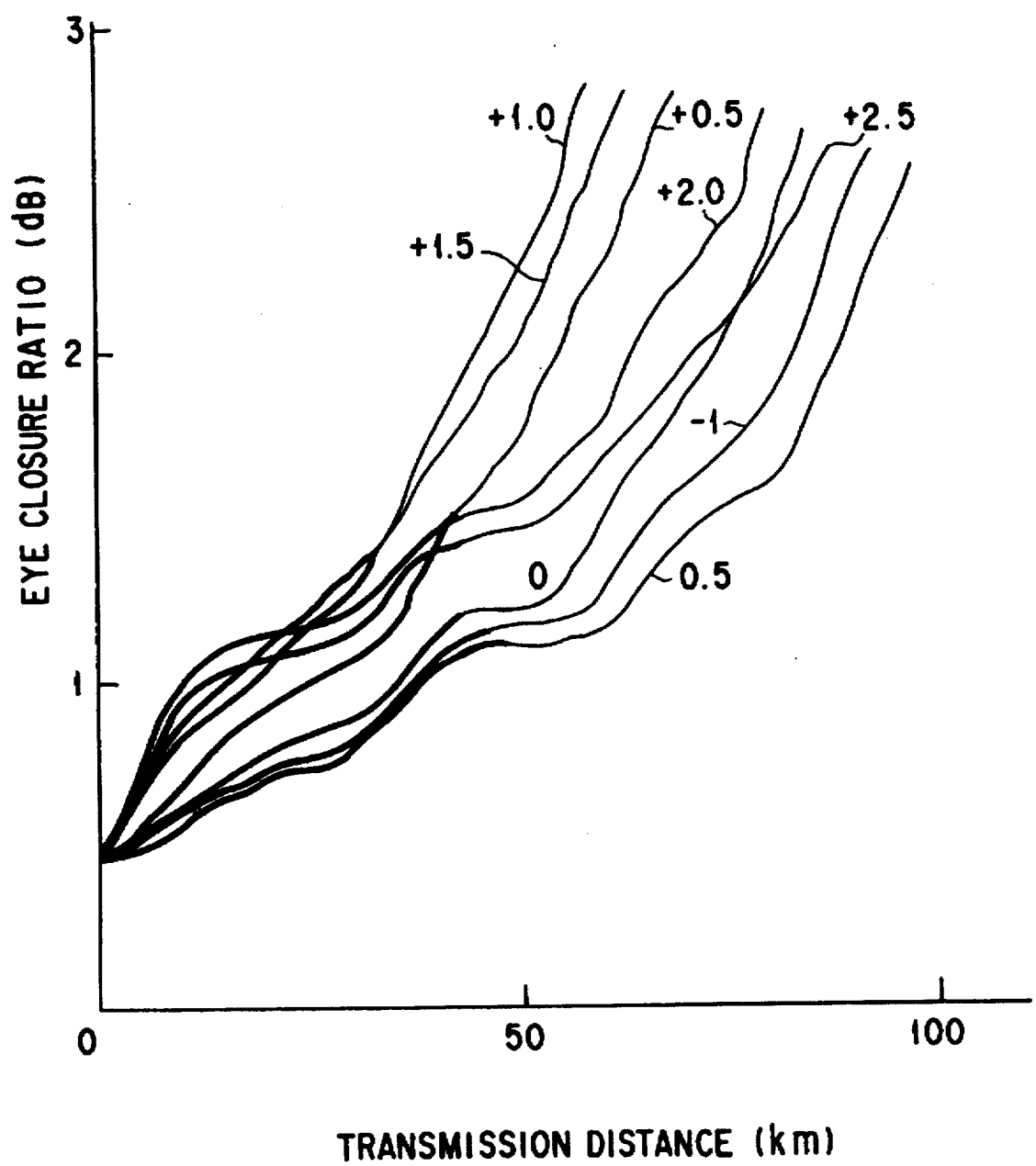
F I G. 13

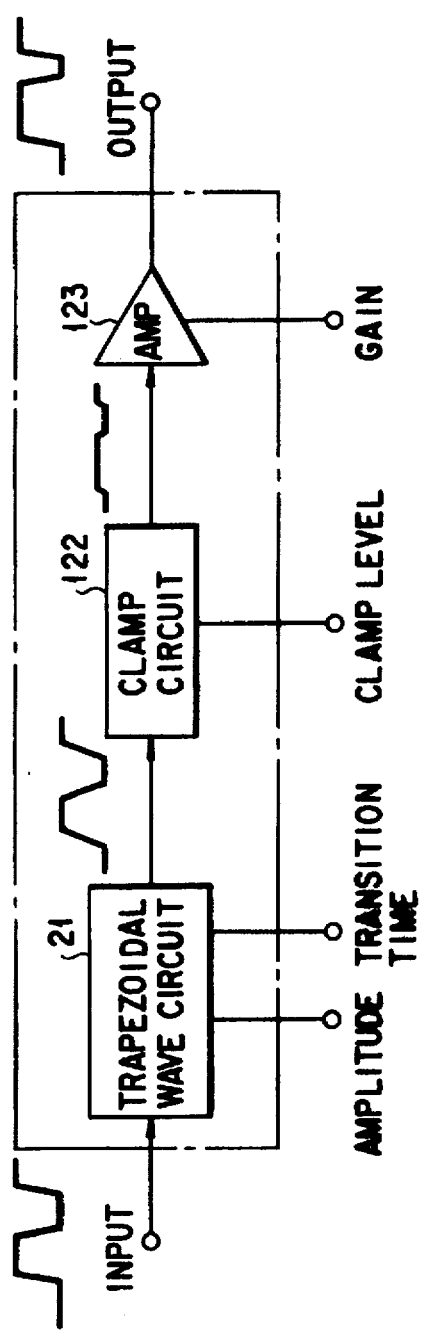
F I G. 14A
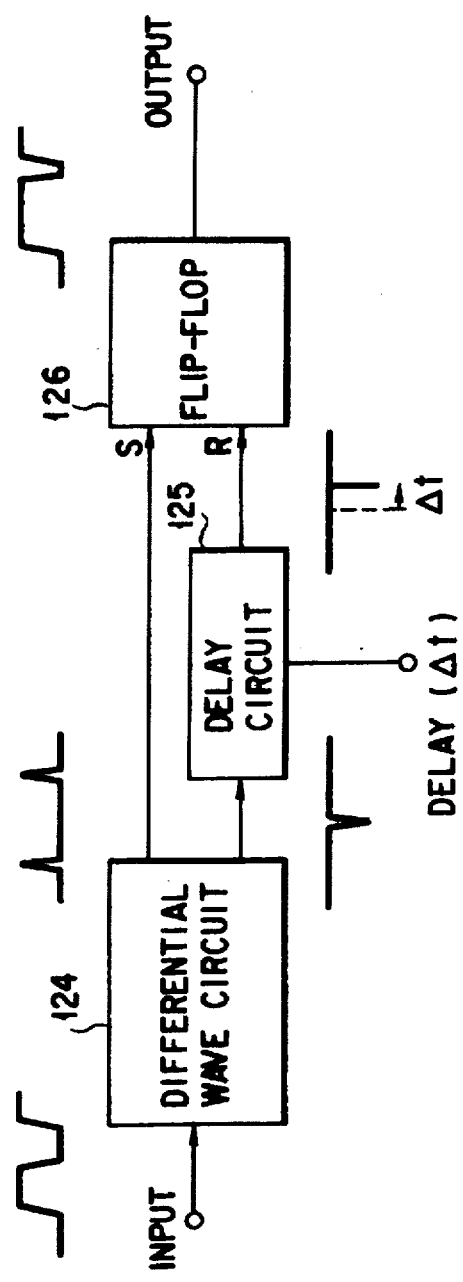
F I G. 14B

OPTICAL TRANSMISSION SYSTEM, OPTICAL TRANSMISSION MODULE, AND AN OPTICAL MODULATOR

BACKGROUND OF THE INVENTION

1. Field of the Invention

The present invention relates to an optical transmission system, an optical transmission module, an optical modulator, and method of driving optical modulator.

2. Description of the Related Art

The recent developments in optoelectronic technology, including dispersion-shifted fibers, high-speed optical modulators, and erbium-doped fiber amplifiers, have enabled long-haul fiber transmission of ultrahigh-speed signals in the 1.55 μm-wavelength band. In the areas where non-dispersion-shifted fibers have already been laid, however, even when an external modulator with a small wavelength chirp (a wavelength shift due to modulation) is used, a high-speed signal whose bit rate is 10 Gb/s or more cannot be transmitted over a long distance, making it difficult to increase the transmission capacity in a cost-effective manner as the amount of information will increase in the future.

According to P. S. Henry, IEEE J. Quantum Electronics, vol. QE-21, December, 1985, pp. 1862-1879, the limit distance L of fiber transmission in the case of chirpless modulation is expressed by:

$$L \leq c/(2D\lambda^2 B^2) \qquad (1)$$

where c is the speed of light, D is the dispersion of the fiber, λ is the wavelength, and B is the bit rate. This limit causes from modulation sidebands.

For example, if signal transmission at a bit rate of 10 Gb/s is to be performed by the use of a non-dispersion-shifted fiber having a wavelength dispersion of about 15 ps·km$^{-1}$·nm$^{-1}$ at a wavelength of 1.55 μm, where erbium-doped amplifiers can be used, a signal can be transmitted only as far as about 40 km unless suitable dispersion compensation is effected.

Even when an external modulator is used, actual optical modulation involves wavelength chirping. Chirp parameter α is used as a quantity indicating the ratio of phase modulation to intensity modulation. When an electroabsorption semiconductor optical modulator is used, α changes greatly, depending on the voltage. From the optical fiber transmission characteristic, however, art equivalent chirp parameter α can be defined. If α is in range of 0 to −1, suitable pulse compression will take place, making the transmission limit distance longer a little (see A. H. Gnauch et al., IEEE Photonics Technology Letters, vol. 3, October, 1991, pp. 916–918). As compared with the case of α=0, however, the transmission limit distance in signal transmission at a bit rate of 10 Gb/s is improved to the extent that it gains only a stretch of about 10 km.

Furthermore, in the case of electroabsorption semiconductor modulators, the equivalent chirp parameter α often takes the value ranging from +0.5 to +2, with the result that the transmission limit distance is shorter than when α=0. Recently, it has been reported that with an electroabsorption semiconductor optical modulator, the expression α<0 can be fulfilled by bringing the working wavelength and the peak wavelength of exciton absorption closer to each other than in the prior art (see J. A. J. Fells et at., Electron Letters, vol. 30, July, 1994, pp. 1168–1169). Since this method involves a decrease in the extinction ratio and an increase in the insertion loss, the transmission limit distance does not get as longer as expected.

To break down the limits of the transmission limit distance due to such waveform dispersion, various dispersion compensation techniques have been proposed. However, most of them are complicated and expensive and the optical power penalty is large.

The simplest method is a dispersion compensation by connecting a fiber with an inverse large wavelength dispersion. A dispersion compensation fiber whose wavelength dispersion is about −70 ps·km$^{-1}$·nm$^{-1}$ has been developed. With the method, however, the length of the optical fiber must be increased about 25% more than the actual transmission distance. On the other hand, when the gain of the optical fiber amplifier is increased to compensate for an increase in the aforementioned loss, the power penalty gets larger as a result of an increase in noise.

As described above, in the prior art, it is difficult to transmit a high-speed binary digital NRZ signal whose bit rate is 10 Gb/s or more over a long distance by the use of an optical fiber with large wavelength dispersion. Although dispersion compensation makes the transmission limit distance longer, this results in increases in the cost and the power penalty.

SUMMARY OF THE INVENTION

Accordingly, the object of the present invention is to provide an optical transmission system, an optical transmission module, an optical modulator and a method of driving an optical modulator which make it possible to transmit a high-speed binary digital NRZ signal whose bit rate is 10 Gb/s or more over a long distance by the use of an optical fiber with large wavelength dispersion without increasing the cost and the power penalty.

According to a first aspect of the present invention, there is provided an optical transmission system comprising an optical transmitter for transmitting an optical signal, comprising an optical modulator for modulating an intensity of the optical signal in accordance with a binary digital NRZ (nonreturn-to-zero) electric signal and outputting a transmission optical signal; and means for supplying the electric signal and thereby driving the optical modulator, the means including means for adjusting a waveform of the electric signal supplied to the optical modulator so that a timing with which the optical signal outputted from the optical modulator transits from a high level to a low level is later than a timing with which the optical signal transits from the low level to the high level; an optical fiber with wavelength dispersion for propagating the signal light transmitted from the optical transmitter; and an optical receiver for receiving the optical signal propagated along the optical fiber and reconstituting an electric signal from the optical signal.

With the above optical transmission system, the adjusting means may include a timing adjusting circuit for adjusting the level transition timings. It is preferable that the timing adjusting circuit include means for making adjustments so that a delay between the timings is 15% or more of a single time slot. It is more preferable that the timing adjusting circuit include means for making adjustments so that a delay between the timings is in range of 20% to 40%. In this case, if a bit rate of the optical signal transmitted from the optical transmitter is B [bits/s], it is preferable that an equalization band in the optical receiver be in range of 0.8 B [Hz] to 1.3 B [Hz].

Furthermore, it is preferable that an effective chirp parameter in the optical modulator be in range of −1 to 0.

Additionally, the timing adjusting circuit may include means for making adjustments so that a delay between the timings is in range of 15% to 40% of a single time slot. In addition, the optical receiver may include means for measuring a high-level dispersion width and low-level dispersion width of the electric signal after an equalizer and before a decision circuit. In this case, it is preferable that the timing adjusting circuit include means for adjusting a delay between the timings according to the values of the two types of dispersion width measured at the measuring means. Specifically, it is preferable that the timing adjusting circuit include means for adjusting a delay between the timings so that the high-level dispersion width and low-level dispersion width of the electric signal after the equalizer and before the decision circuit in the optical receiver are equal to each other.

According to a second aspect of the present invention, there is provided an optical transmission module comprising an optical modulator for modulating an intensity of an optical signal in accordance with a binary digital NRZ (nonreturn-to-zero) electric signal; and a driving circuit for supplying the electric signal and thereby driving the optical modulator, the driving circuit including a timing adjusting circuit for adjusting a waveform of the electric signal supplied to the optical modulator so that a timing with which the optical signal outputted from the optical modulator transits from a high level to a low level is later than a timing with which the optical signal transits from the low level to the high level.

With the optical transmission module, it is preferable that the timing adjusting circuit include means for making adjustments so that a delay between the timings is 15% or more of a single time slot. Furthermore, the module may be provided with an input terminal for inputting a control signal to control a delay between the timings to the timing adjusting circuit.

According to a third aspect of the present invention, there is provided an optical modulator for modulating the intensity of an optical signal in accordance with a binary digital NRZ (nonreturn-to-zero) electric signal, wherein a working wavelength, bias voltage, and modulation voltage amplitude of the optical modulator are set so that an extinction ratio of the optical modulator is 10 dB or more, and a timing with which the optical signal outputted from the optical modulator transits from a high level to a low level is later than a timing with which the optical signal transits from the low level to the high level.

With the optical modulator, a delay between the timings may be 15% or more of a single time slot. Preferably, the delay between the timings is in range of 20% to 40% of a single time slot.

It is preferable that the working wavelength, bias voltage, and modulation voltage amplitude are set so that an equivalent chirp parameter in the optical fiber is in range of 0 to −1. Alternatively, it is preferable that the working wavelength, bias voltage, and modulation voltage amplitude are set so that an equivalent chirp parameter in the optical fiber is in range of +2 to +3.5.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1 schematically shows the configuration of an optical transmission system according to a first embodiment of the present invention;

FIGS. 3A to 3D are timing charts used to explain the operation of the transition timing adjusting circuit of FIG. 2;

FIG. 7 shows the relationship between the transition timing shift amount $\Delta t$ and the transmission limit distance in the optical transmission system of FIG. 1;

FIG. 8 shows the relationship between the equalizer bandwidth and the transmission limit distance with the transition timing shift amount $\Delta t$ as a parameter in the optical transmission system of FIG. 1;

FIG. 10 schematically shows the configuration of an optical transmission module according to a third embodiment of the present invention;

FIGS. 11A to 11E shows the difference between eye patterns in a 100-km transmission as a result of the difference between equivalent chirp parameters $\alpha$ in a case where optical fiber transmission is effected using a method of driving an optical modulator according to a fourth embodiment of the present invention;

FIG. 13 shows the difference between the eye closure ratios as a result of the difference between equivalent chirp parameters $\alpha$ in a case where optical fiber transmission is effected using a conventional method of driving an optical modulator differing from the method of driving an optical modulator of the fourth embodiment; and FIGS. 14A and 14B schematically show modifications of the transition timing shift circuit related to the present invention.

DETAILED DESCRIPTION OF THE PREFERRED EMBODIMENTS

Figure 2:
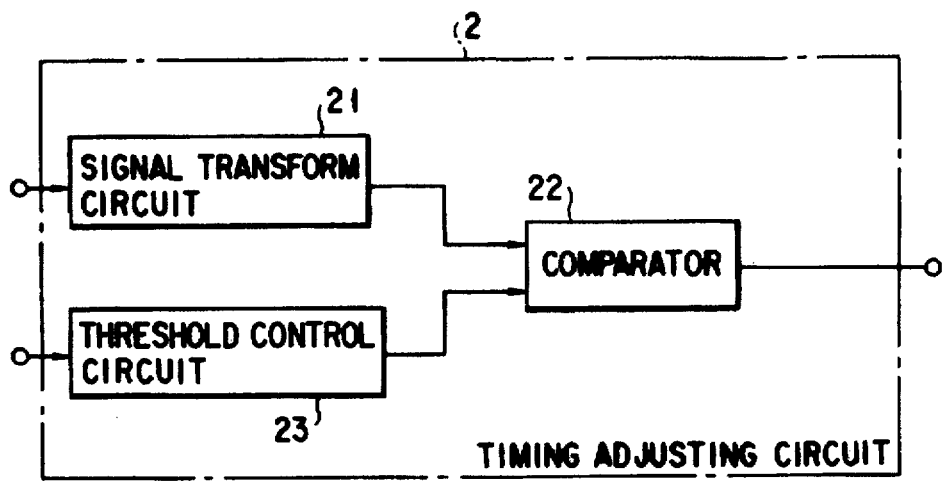
FIG. 2 is a block diagram of the internal configuration of a transition timing adjusting circuit provided in an optical transmitter constituting the optical transmission system of FIG. 1.

Before explanation of embodiments, the basic concept common to embodiments will be explained in detail.

The present invention is characterized in that the timing with which the optical modulator output transits from a high level to a low level is made later than the timing with which the optical modulator output transit from the low level to the high level.

Here, it is assumed that a level with a large optical power is "1" and a level with a low optical power is "0." Since modulation causes sidebands in the optical spectrum, even if chirp parameter is 0, the pulse waveform cannot avoid being changed as a result of the effect of wavelength dispersion during optical fiber transmission. Since the spectrum spreads in the vicinity of the transition period where the optical power changes, the waveform particularly starts to change in the transition period. That is, the foot of pulses spread, while the top of pulses becomes narrow. It is when there is only one "0" slot in consecutive "1" levels ("1 . . . 1 0 1 . . . 1") or when there is only one "1" slot in consecutive "0" levels ("0 . . . 0 1 0 . . . 0) that the effect becomes particularly significant.

The degree of the effect, however, is not the same in these two cases; it is the latter case that restricts the transmission limit distance. Since the optical power near the peak is greater than the optical power at the foot even in the transitional state, the magnitude of the energy that shifts with transmission under the influence of wavelength dispersion is great. As a result, when the electric signal waveform is observed after the signal deformed due to its propagation over a fiber having wavelength dispersion has been received and equalized, the level spread in "1" is greater than that in "0".

The gist of the present invention is that when there is a pattern of a change of "01" or "10", optical modulation is effected so that the duration of a "1" slot adjacent to a "0" slot may be made longer than that of the "0" slot by making earlier the timing with which the level changes from "0" to "1" or making later the timing with which the level changes from "1" to "0" or by doing both, thereby suppressing a drop in the level of the "1" slot adjacent to the "0" slot due to wavelength dispersion. Although this raises the level of the "0" slot adjacent to the "1" slot after transmission, worsening the level spread in "0" of the equalized waveform, the level spread in "1", which restricts the transmission limit distance, becomes smaller.

In the vicinity where the level spread in "0" and that in "1" after equalizer are almost equal to each other, the matching with the eye mask is the best (the trace comes to fit in the eye mask). Although influenced by the transmission distance and the characteristics of the optical modulator, the asymmetry of "1" slots and "0" slots of the equalized waveform is improved remarkably, making the transmission limit distance longer, when the timing with which the optical output transits from "1" to "0" is delayed 15% or more of a single time slot from the timing with which the optical output transits from "0" to "1". When the timing is delayed in range of 20% to 40% of a single time slot, the transmission limit distance can be maximized.

With the optical transmission system of the present invention, restrictions on the equalizer bandwidth of the receiver are severe, as compared with a conventional optical transmission system. With the bit rate of the transmitted optical signal being B [bits/s], if the equalizer bandwidth of the optical receiver ranges from 0.8 B [Hz] to 1.3 B [Hz], the transmission limit distance will be improved remarkably. When the band exceeds the range, the transmission limit distance will worsen sharply. If the effective chirp parameter α of the optical modulator is in range of −1 to 0, appropriate pulse compression will take place, which is preferable. Although the same effect is found in the prior art, the present invention enables the transmission limit distance to be made much longer. The reason for this will be explained later.

In the case of an optical transmission system where conditions of optical transmission change greatly, such as an optical network that transmits optical signals while switching the connection between nodes, the amount of delay must be made variable so that the level spread in "1" and that in "0" of the electric signal after equalization and before decision may be adjusted so as to provide the best matching with the eye mask (so as to enable the trace to fit well in the eye mask), regardless of transmission conditions. The optimum receiving state can be achieved, regardless of changes in the transmission conditions, especially by adjusting the transition timing so that the level spread in "0" and that in "1" after equalization may have a particular ratio. Generally, in the vicinity where the level spread in "0" and that in "1" after equalization are equal to each other, the matching with the eye mask is the best, realizing the optimum receiving state.

The transformation of the driving waveform described above may be carried out at one of the circuits on the board of the optical transmitter or at an optical transmission module. With a conventional optical transmission module incorporating a driving circuit synchronized with a clock, even if the driving waveform has been deformed outside the module, it will be shaped into the original waveform inside the module. Accordingly, to shift the transition timing outside the module, it is necessary to make a suitable provision on the circuit so that the transition timing shift may be transmitted to the optical modulator, regardless of the clock pulse. When the driving waveform is transformed inside the module, the optimum adjustment suited for the situation of each transmission system can be achieved by providing an input terminal to which a signal is supplied to adjust the transition timing shifts of "01" and "10." In addition to the above network application, in a case where the dispersion characteristic varies due to temperature changes, the optimum state can be always kept by feeding back the difference between the spread in "0" level and that in "1" level from the optical receiver to the optical transmitter.

With the present invention, too, when chirp parameter α is set at a small negative value, the transmission limit distance is the longest. When an electroabsorption semiconductor optical modulator is used, however, it is difficult to make the equivalent chirp parameter α smaller. Specifically, it is necessary to reduce wavelength detuning between the signal and the peak of exciton absorption or to use in a voltage range where loss is great. At any rate, an increase in the penalty results from a decrease in the extinction ratio or an increase in the insertion loss. With the present invention, the transmission limit distance becomes much longer than when chirp parameter α is simply adjusted to a small negative value.

Now, consider a case where a pattern of "010" is modulated by an optical modulator with α=0 to −1 using a conventional driving method and the modulated signal is forced to travel on an optical transmission path having anomalous dispersion. Because at first, pulse compression effect is obtained as a result of waveform chirping and anomalous dispersion, the dullness of the peak is smaller over far as a particular distance than when α=0. When the distance exceeds the particular distance, the dullness of the pulse becomes greater again because the energy of the wavelength chirp components moves to places other than the pulse peak. When an optical modulator with α=0 to −1 is driven by the method of driving an optical modulator according to the present invention, the pulse pattern width is greater in transmitting a pattern of "010" than when it is driven by a conventional driving method, with the result that the distance over which the energy of the wavelength chirp components travels until it reaches the pulse peak position gets longer. Namely, with the method of driving an optical modulator according to the present invention, the effect of pulse compression lasts far beyond the conventional transmission limit distance, so that the degree of improvement in the transmission limit distance by the use of an optical modulator with $\alpha=0$ to $-1$ increases remarkably as compared with the conventional method of driving an optical modulator.

The reason why the present invention is particularly sensitive to the equalization bandwidth of the receiver is that the invention makes good use of the pulse compression effect. Specifically, when the equalization band is too narrow, a sufficient pulse compression effect cannot be obtained; conversely, when the equalization band is too wide, the pulse compression effect will cause an excessive peak.

When chirp parameter $\alpha$ is in range of $+1$ to $+1.5$, the pulse spreads due to wavelength chirping and anomalous dispersion, leading to the worst transmission limit distance. In this case, the level of a "0" slot adjacent to a "1" slot rises most, worsening the interference between codes. When chirp parameter $\alpha$ gets larger and reaches about $+2.5$, the transmission limit distance gets longer again because the entire width of "0" level becomes greater but the increase of "0" level adjacent to the "1" is suppressed. Namely, the energy shifted due to wavelength chirping and dispersion does not concentrate on a particular decision point but spreads throughout, which suppresses the spread of level at the decision point. Since the present invention is based on the assumption that the spread of "0" level after transmission has a sufficient margin, the greatest effect is obtained at $\alpha=0$ to $-1$. Even at $\alpha=+2$ to $+3.5$, however, a sufficiently great effect can be obtained. Here, in any case, to suppress the spread of "0" level, the extinction ratio must be sufficiently large ($\geq 10$ dB).

First Embodiment

FIG. 1 schematically shows the configuration of an optical transmission system according to a first embodiment of the present invention. The optical transmission system of the embodiment comprises an optical transmitter 100, a non-dispersion-shifted optical fiber 101 (with a wavelength dispersion of 17 ps·km$^{-1}$·nm$^{-1}$), and an optical receiver 102. Although a control system and a monitor system are needed, they are omitted for the sake of clarity.

The major components of the optical transmitter 100 include a signal preprocessing unit 1, a transition timing adjusting circuit 2, a driving circuit 3, and an optical modulator integrated light-source module 4. The preprocessing unit 1 performs multiplexing and coding so that the input signal may be converted into a form suitable for optical fiber transmission and supplies to the transition timing adjusting circuit 2 a binary digital NRZ signal whose bit rate is 10 Gb/s. The transition timing adjusting circuit 2 adjusts the transition timing of driving waveform so that the timing with which the modulated optical output transits from "0" to "1" and the timing with which the output transits from "1" to "0" may be shifted a specific time with respect to a standard time slot. The output of the transition timing adjusting circuit 2 is processed at the driving circuit 3 composed of an ordinary high-speed, high-power amplifier circuit and a bias adjusting circuit so that the voltage of a "1" state and that of a "0" state may be at specific values and the resulting signal is inputted to the optical modulator integrated light-source module 4. The transition timing of driving waveform hardly changes even after the signal has passed through the driving circuit 3.

The optical modulator integrated light-source module 4 contains a semiconductor element 7 into which a single mode semiconductor laser 5 and an electroabsorption semiconductor optical modulator 6 are integrated monolithically, a matching resistor 8 for a driving signal, a temperature sensing element 9, a Peltier cooler 10, a photodiode 11 for laser output monitoring, and an output optical system 12 including an optical isolator and lenses. The modulated light is outputted at a fiber pigtail 13. An externally provided temperature adjusting circuit 14 and laser output stabilizing circuit 15 stabilize the output wavelength and output optical power.

The electroabsorption semiconductor optical modulator 6 has a bandwidth of 20 GHz or more and adequately follows a driving signal whose bit rate is 10 Gb/s because it is matched with the signal by the use of the strip line and matching resistor 8. As a result of the driving waveform being processed at the transition timing adjusting circuit 2, the signal is outputted with the transition timing of the signal light being shifted a specific time from the standard time slot. Since the input/output characteristic of the electroabsorption semiconductor optical modulator 6 is nonlinear, there is a little difference in transition timing between the driving waveform and the modulated optical waveform.

After the optical signal outputted from the optical modulator integrated light-source module 4 has been amplified at a booster optical amplifier 16, it is sent to an optical fiber 101 and received by the optical receiver 102. The optical receiver 102 of the embodiment does not differ from a conventional optical receiver and has its equalization bandwidth set at 10 GHz.

FIG. 2 is a block diagram of the internal configuration of the transition timing adjusting circuit 2 provided in the optical transmitter 100 constituting the optical transmission system of FIG. 1. As shown in FIG. 2, the transition timing adjusting circuit 2 contains a signal transform circuit 21 that transforms a signal into a trapezoidal waveform, a high-speed comparator 22, and a threshold adjusting circuit that adjusts the threshold value of the high-speed comparator 22. The outputs of the signal transform circuit 21 and threshold adjusting circuit 23 are sent to the high-speed comparator 22.

FIGS. 3A to 3D are timing charts used to explain the operation of the transition timing adjusting circuit 2 of FIG. 2. FIG. 3A shows the input signal to the circuit 21. FIG. 3B shows the input signal to the high-speed comparator 22. FIG. 3C shows the output signal of the high-speed comparator 22. FIG. 3D shows the output of the optical modulator 6.

By adjusting the threshold value of the high-speed comparator 22 at the threshold adjusting circuit 23 of FIG. 2, the transition timing of "01" and that of "10" can be shifted $\Delta t$ for each time slot. When the comparator output is amplified at the driving circuit 3 and applied to the optical modulator 6, an optical output waveform where the transition timing of "01" and that of "10" are shifted $\Delta T$ as shown in FIG. 3D is obtained. Because of the nonlinear response of the optical modulator 6, $\Delta t$ shifts a little from $\Delta T$.

Figure 4:
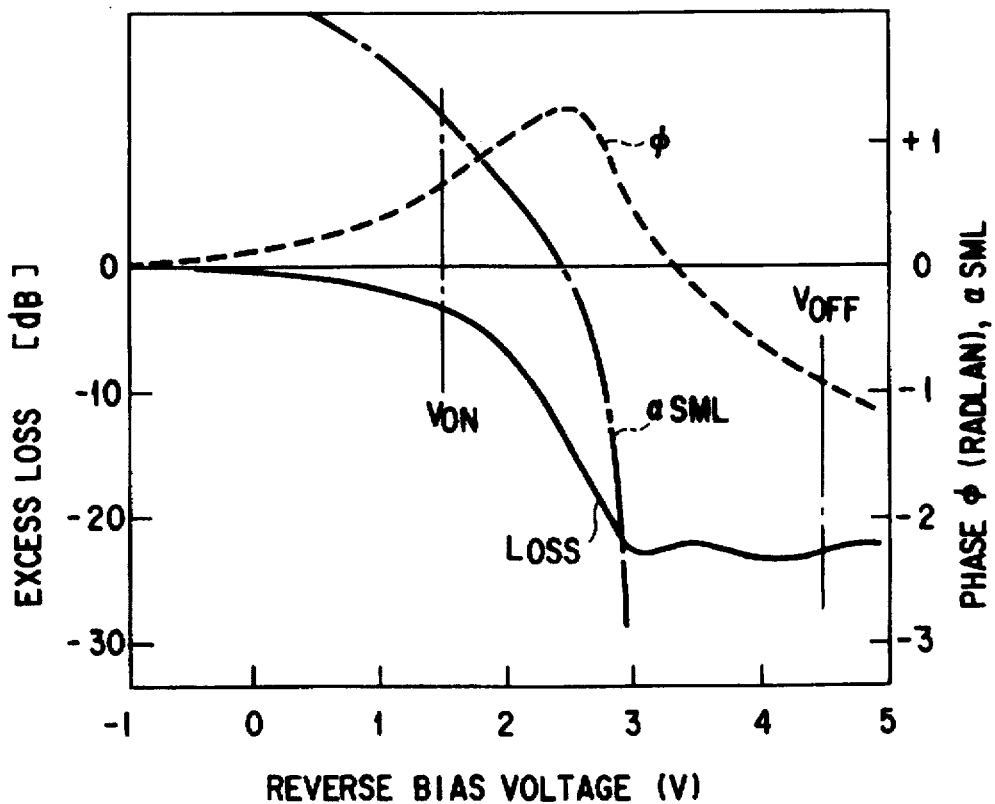
FIG. 4 is a diagram showing the dependence of an optical modulator output on the applied voltage, the optical modulator provided in an optical modulator integrated module constituting the optical transmission system of FIG. 1.

The optical modulator used in the embodiment is an electroabsorption semiconductor optical modulator 6 using QCSE (quantum confined Stark effect) of a quantum well having the voltage characteristic as shown in FIG. 4. As seen from FIG. 4, the chirp parameter α of a small signal becomes negative when the reverse bias is deep. By setting an applied voltage corresponding to "1" at 1.5 V and a reverse bias voltage corresponding to "0" at 4.5 V, the extinction ratio can be set at 15 dB or more and equivalent chirp parameter α in a long-distance transmission at a bit rate of 10 Gb/s can be set at a small negative value (−0.2 to −0.5).

FIGS. 5A to 5F show equalized eye patterns at each point on a non-dispersion-shifted optical fiber (wavelength dispersion of 17 ps·km$^{-1}$·nm$^{-1}$) at a bit rate of 10 Gb/s in a manner to compare the case of the optical transmission system of FIG. 1 with a conventional optical transmission system.

Figure 5A:
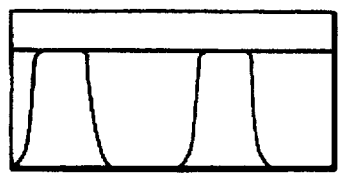
FIGS. 5A to 5F show equalized eye patterns at each point on a non-dispersion-shifted optical fiber at a bit rate of 10 Gb/s in a manner to compare the case of the optical transmission system of FIG. 1 with a conventional optical transmission system.
Figure 5D:
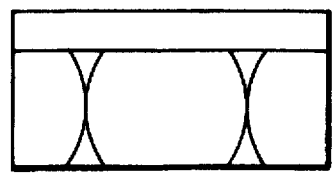
Figure 5B:
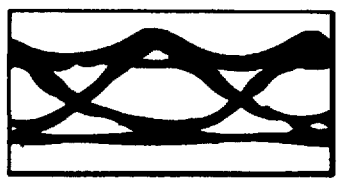
Figure 5E:
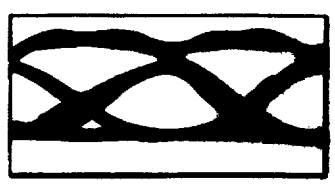
Figure 5C:
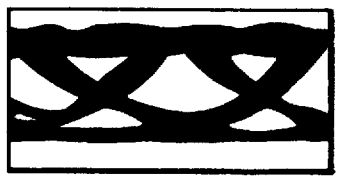
Figure 5F:
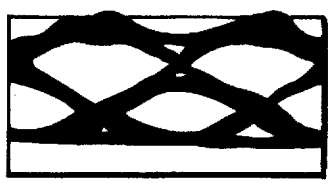

Here, FIGS. 5A to 5C correspond to the optical transmission system of FIG. 1. FIGS. 5D to 5F correspond to a conventional transmission system. The conventional optical transmitter has a structure obtained by removing the transition timing adjusting circuit 2 from the optical transmitter of FIG. 1 and connecting the preprocessing section 1 directly to the driving circuit 3. FIGS. 5A and 5D show the patterns of the output of the optical transmitter. FIGS. 5B and 5E show equalized patterns at a 75-km point after reception. FIGS. 5C and 5F show equalized patterns at 100-km point after reception.

The output of the optical transmitter of the embodiment is adjusted so that the timing of "01" transition may be advanced 19 ps and the timing of "10" may be delayed 19 ps. It is assumed that the transition timing is defined as the time when the optical power at the mid-point between the "1" level and "0" level of CW (continuous wave) has been reached. The timing of "10" transition is delayed 38% of a single time slot (100 ps) from the timing of "01" transition. Comparison of eye patterns after transmission over a non-dispersion-shifted optical fiber shows that use of the conventional optical transmission system makes the spread in "1" level greater, whereas use of the optical transmission system of the embodiment makes the spread in "0" level greater but the spread in "1" smaller, resulting in an improvement in the balance.

Figure 6:
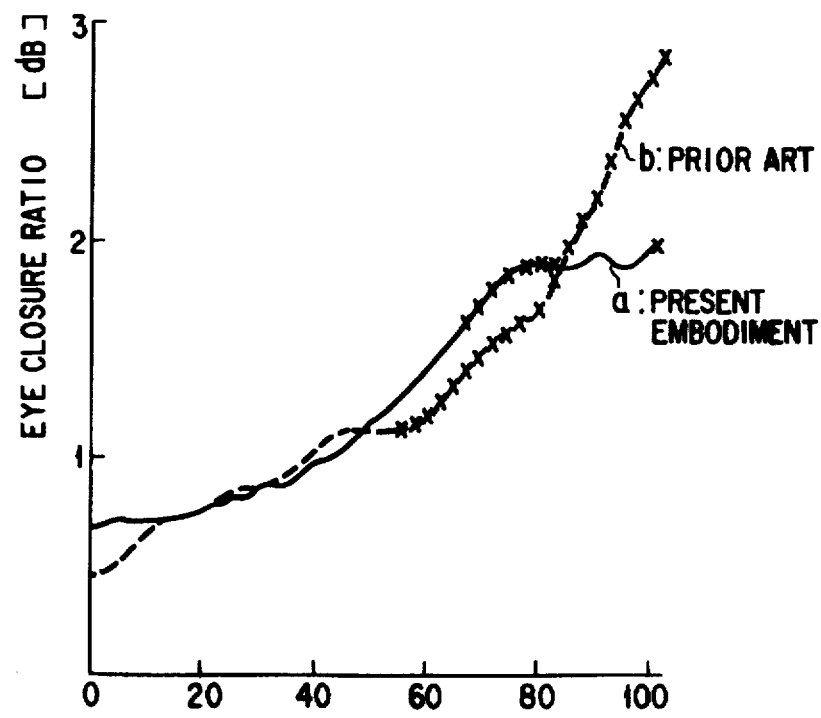
FIG. 6 shows eye closure ratio of 10 Gb/s NRZ signal after transmission through an optical fiber with a wavelength dispersion of 17 ps·km$^{-1}$·nm$^{-1}$ in a manner to compare the case of the optical transmission system of FIG. 1 with a conventional optical transmissions system.

FIG. 6 shows the difference in the eye closure ratio after the equalization in transmitting a 10 Gb/s binary digital NRZ signal via an optical fiber with a wavelength dispersion of 17 ps·km$^{-1}$·nm$^{-1}$ in a manner to compare the case of the optical transmission system of FIG. 1 with a conventional optical transmissions system. In this case, the eye closure ratio means the ratio of minimum eye opening in a decision time window to the average level difference between "1" and "0." In the figure, the solid line a indicates the result of optical transmission by the optical transmission system of the embodiment and the broken line b indicates the result of optical transmission by the conventional optical transmission system. The mark X represents an eye mask failure point.

Use of the optical transmission system of the embodiment impairs the eye opening for short-distance transmission a little but improves the eye opening after long-distance transmission remarkably. According to eye mask test, the transmission limit distance is improved from 52.5 km to 95 km or more. The reason why the transmission limit distance is almost doubled although the size of the eye opening is not improved so much is that the symmetry between "1" and "0" in the eye pattern is improved, making the matching with the eye mask better.

In the example, the trace has once gone over the eye mask in the transmission distances ranging from 65 to 85 km, but has fitted again in the eye mask at distances larger than the range. The reason why the trace goes over the eye mask in the transmission range of 65 to 85 km is that the energy of "1" level is surplus as a result of pulse compression, permitting the level of "1" adjacent to "0" at transmission distances in the range, especially, the "1" level of a "010" pattern, to rise too much. Much greater dispersion causes the energy of wavelength chirp components to shift to the opposite side of the peak, making the pulse width greater, with the result that the trace fits in the eye mask again. When the transmission distance is about 75 km, a waveform fitting in the eye mask can be obtained by setting the shift amount of transition timing at 15% or more of a single time slot. Therefore, the optimum shift amount varies with the transmission distance (the total dispersion). Furthermore, the optimum shift amount also varies a little, depending on the pattern.

FIG. 7 shows the relationship between the transition timing shift amount Δt and the transmission limit distance in the optical transmission system of FIG. 1. As shown in the figure, the transmission limit distance is maximal when the timing shift amounts Δt of "01" and "10" are in range of 20 ps to 40 ps (20% to 40% of the standard time slot).

FIG. 8 shows the relationship between the reception equalization band and the transmission limit distance with the transition timing shift amount Δt as a parameter in the optical transmission system of FIG. 1.

As shown in the figure, because the peak of "010" pattern is low when the transition timing shift amount Δt is negative (−12%), the transmission limit distance does not get longer. When the sharpness of the pulse is enhanced by widening the reception band, the transmission limit distance is improved but the degree of the improvement is low. When the transition timing shift amount Δt is positive and reaches about +10% (in the example shown, +8%), the transmission limit distance is improved, making the dependence on the reception band smaller. Furthermore, when the transition timing shift amount Δt is increased from +15% to +40% (in the figure, the cases of 18%, 28%, and 38% are shown) in the embodiment, the transmission limit distance is improved remarkably only when the reception band is made almost equal to bit rate B. Because widening the reception band too much enhances the vibrational components due to excessive pulse compression, the transmission limit distance drops rapidly. Further making the transition timing shift amount Δt greater permits the foot of the pulse to raise the "0" level, causing the transmission limit distance to decrease rapidly.

As described above, with the embodiment, the transmission limit distance is very sensitive to the equalization bandwidth. To maximize the transmission limit distance by setting the transition timing shift amount Δt at +20% to +40%, the reception equalization band must be set in the range 0.8 to 1.3 times the bit rate.

It also be possible to construct such that the driving circuit can adjust the timing with which the driving waveform transits by itself, without providing with the timing adjusting circuit.

Second Embodiment

Hereinafter, an optical transmission system according to a second embodiment of the present invention will be explained.

Figure 9:
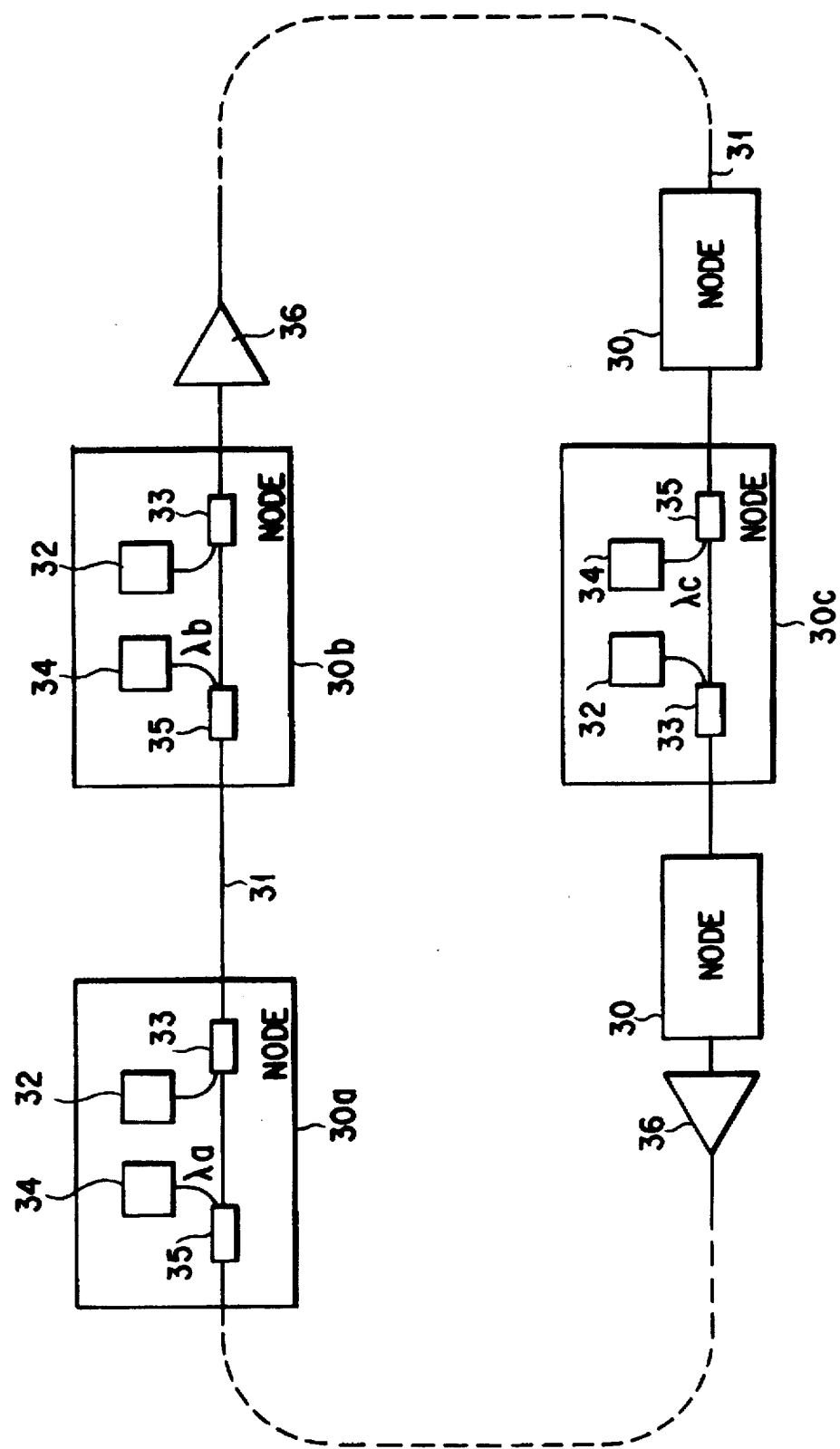
FIG. 9 schematically shows the configuration of an optical transmission system (a wavelength-division multiplexing network) according to a second embodiment of the present invention.

FIG. 9 schematically shows the configuration of an optical transmission system according to a second embodiment of the present invention.

As shown in the figure, the optical transmission system constitutes a wavelength-division network where a plurality of nodes 30 that perform add-drop multiplexing are connected to each other via an optical fiber loop 31. Each node 30 comprises an optical transmitter 32, an optical multiplexer 33 that connects the light sent from the optical transmitter 32 to the optical fiber loop 31, an optical receiver 34, and an optical demultiplexer 35 that branches only a ray with a specific wavelength to the optical receiver. Optical amplifiers 36 are inserted at certain intervals. The configuration of the optical transmitter is almost the same as that of the first embodiment except that a wavelength tunable laser is used as a semiconductor laser light source and that the transition timing shift amount in the transition timing adjusting circuit can be changed in range of 0% to 40% of a time slot.

The optical transmitter 32 at transmission node 30a selects wavelength λb allocated to addressee reception node 30b and sends the modulated signal light to the optical fiber loop 31. At reception node 30b, the optical receiver 34 receives only a ray of light with a wavelength of λb. It is assumed that after light has been transmitted to reception node 30b, light is then transmitted to node 30c. The Optical transmitter changes the wavelength from λb to λc and transmits light. In the second embodiment, the wavelength is determined for each addressee node. Providing the reception side with a wavelength selecting function makes it possible to construct a flexible, highly available network.

With such a network, the transmission distance and wavelength vary from one combination of transmission and reception nodes to another. As explained in the first embodiment, the optimum transition timing shift amount varies, depending on the total dispersion, or on the transmission distance and wavelength. In the second embodiment, the optical transmitter 32 is designed to adjust the transition timing shift amount for each combination of transmission and reception nodes.

Specifically, before the start of signal transmission, a test pattern is transmitted. At reception node 30b, the optical receiver 34 monitors the spreads in "1" level and "0" level of the reception equalization waveform and feeds back the result to the optical transmitter 32 at transmission node 30a. The optical transmitter 32 adjusts the shift amount of transition timing so that the spreads in "1" level and "0' level of the monitored equalized signal may be almost equal to each other. Once data has been collected for each addressee node (or for each wavelength), it is not necessary to make adjustments using the test pattern in the second transmission or later, but the shift adjustment may be adjusted according to the stored data. It is, of course, possible to make automatic adjustments every moment to variation with time or change in the trend of the signal pattern.

Third Embodiment

Hereinafter, an optical transmission module according to a third embodiment of the present invention will be explained.

Because a high-speed signal whose bit rate is about 10 Gb/s has an impedance matching problem, it is preferable that the module contain a driving circuit in order to make the transmission distance of the shaped and amplified driving circuit output to an optical modulator as short as possible. A conventional waveform shaping circuit is of the clock-synchronized type and has no transition timing shift function.

FIG. 10 shows the configuration of the optical transmission module of the third embodiment. The optical transmission module incorporates an optical modulator driving IC 41 having a transition timing shift function. A buffer amplifier 42 in the input stage of the IC shapes the waveform in a clock synchronizing manner. The buffer amplifier 42 outputs an almost trapezoidal waveform whose rise time and decay time are both 60 ps. The output is inputted to a high-speed comparator 43. The high-speed comparator 43 is designed to allow its threshold value to be controlled by an external voltage and outputs a near-square driving waveform where the transition timing is shifted a specific value.

The ringing and jittering of the buffer amplifier 42 output are suppressed sufficiently, enabling a stable transition timing shift in range of ±20 ps (which corresponds to 40% of the standard time slot in terms of the transition timing difference between "01" and "10"). An output amplifier 45 having a large driving capability not only amplifies the output of a comparator 43, but also superimposes a specific DC device voltage on the amplified signal and drives the optical modulator 6. The remaining internal configuration of the module is almost the same as that of the optical transmission module 4 used in the optical transmitter of the first embodiment, and explanation of it will be omitted.

The operation and effect of the third embodiment are almost the same as those of the first and second embodiments. Because the transition timing shift amount can be changed by the voltage applied to the control terminal 44, the amount can be adjusted optimally according to a system to be used, resulting in a high flexibility.

Fourth Embodiment

Hereinafter, an optical modulator and a method of driving the same according to a fourth embodiment of the present invention will be explained.

In the fourth embodiment, an $LiNbO_3$ Mach-Zehender modulator is used for light intensity modulation. As is well known, with the Mach-Zehender modulator, chirp parameter α can be adjusted by setting bias voltages and modulation voltages of two branches. Differential modulation signals are applied to the electrodes of the two branches. At this time, the driving waveforms on the respective branches are transformed in synchronization with each other so that the "01" transition timing and "10" transition timing are shifted 38 ps from each other as shown in the waveform of FIG. 5A. This can be realized by inputting the comparator output to two driving circuits differing in voltage output in an apparatus as shown in FIG. 1, for example. The extinction ratio is 20 dB or more. In this case, too, by setting the bias so that chirp parameter α may be set in range of −1.0 to −0.5 or in the vicinity of +3.0, non-dispersion-shifted fiber transmission over a distance of 85 km or more can be realized without dispersion compensation of a binary digital NRZ signal whose bit rate is 10 Gb/s.

Figure 12:
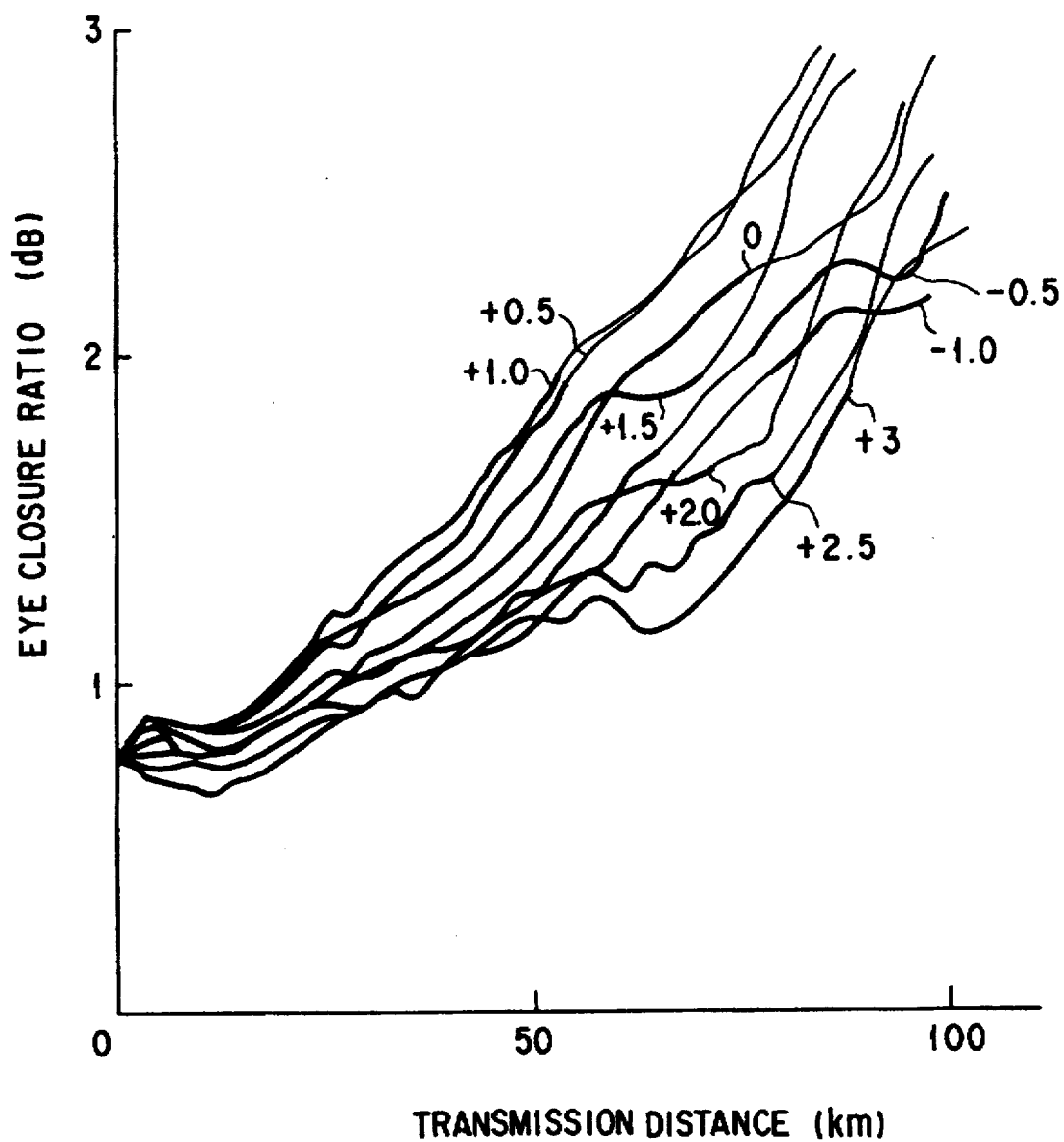
FIG. 12 shows the difference between the eye closure ratios as a result of the difference between equivalent chirp parameters $\alpha$ in a case where optical fiber transmission is effected using the method of driving an optical modulator of the fourth embodiment.

FIGS. 11A to 11E shows the difference between eye patterns in a 100-km transmission as a result of the difference between equivalent chirp parameters α in a case where optical fiber transmission is effected using a method of driving an optical modulator according to the fourth embodiment. Here, the bold lines indicate the ranges where the trace fits in the eye mask and the thin lines indicate the areas where the trace goes over the eye mask. FIG. 12 shows the difference between the eye closure ratio as a result of the difference between equivalent chirp parameters α. In this case, the eye closure ratio means the ratio of eye opening in a decision time window to the average level difference between "1" and "0."

When chirp parameter α is in range of −1.0 to −0.5, transmission over 95 km is possible. The interference between codes is maximum in the vicinity where α is +1 and the transmission limit distance is as short as about 52.5 km. When α has exceeded +2.5, the interference between codes becomes smaller again because the effect of the level spread has reached a distant time band, enabling transmission over 80 km or more (when α=+3, transmission over about 90 km). When α is made too large, the trace will get thicker. The optimum value of α on the larger side, which depends on the system configuration, is in range of about +2.5 to +3.5.

With the method of driving an optical modulator, although the entire spread of "0" level increases a little as a result of setting chirp parameter α at a large value, this is buried in the spread of "0" level resulting from the transformation of the modulated waveform and has no effect. Instead, the effect of suppressing the swelling of "1" level at the slot boundary portion works well, elongating the transmission limit distance remarkably. In contrast, with the conventional method of driving an optical modulator, even when α≧+2.5, the transmission limit distance is not improved so much as shown in FIG. 13.

Here, the above methods are based on the assumption that the extinction ratio is rather large. It is preferable that the rise time and the decay time be short.

The circuit for shifting the transition timing is not limited to the examples of FIGS. 2 and 10, but may be modified in other ways. FIGS. 14A and 14B schematically show modifications of the transition timing shift circuit according the present invention.

The circuit of FIG. 14A is provided with a circuit 21 that produces a trapezoidal wave as with the preceding embodiment. The trapezoidal wave is clamped at a clamp circuit 122 and then the clamped signal is amplified at an amplifier 123 so as to have a specific amplitude. By setting the clamp level and the transition time of the trapezoidal wave, the transition timing delay time can be adjusted.

The circuit of FIG. 14B comprises a circuit 124 that produces a positive or negative differential waveform of the input waveform, a delay circuit 125 inserted in one of the two branches from the circuit 124, and an SR flip-flop that is to be triggered by the differential waveform. By adjusting a delay between the timings of the delay circuit 125, the transition timing can be adjusted.

Higher-speed transmission and longer-distance transmission require dispersion compensation in addition to the adjustment of transition timing. In that case, too, with the optical transmission apparatus, optical transmission module, or optical modulator and method of driving the same according to the present invention, the amount of dispersion compensation can be decreased and the allowable error limit of the compensation amount is improved remarkably. Furthermore, the adjustment flexibility for transmission quality optimization is increased. Therefore, an additional gain of the optical amplifier and noise resulting from the additional gain can be reduced, thereby realizing a high-quality signal transmission without increasing cost and penalty.

The present invention can be applied to lower bit rate, shorter distance transmission. The transmission limit distance L in dispersion limitation when bit rate B or dispersion D is different can be estimated by the well-known scale rules ($DLB^2 \leq c/2\lambda^2$=constant). For example, if a 100-km transmission is possible at 10 Gb/s without dispersion compensation, this means that transmission over about 1600 km will be possible at 2.5 Gb/s.

As described above, with the present invention, a high-speed optical-signal long-distance transmission over a non-dispersion-shifted fiber can be realized by just adding a simple circuit without complex dispersion compensation. Even when dispersion compensation is effected, increases in penalty and cost can be suppressed by making the compensation amount smaller and the permitted limit of the compensation amount becomes larger.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For instance, use of other optical modulators, such as an electroabsorption semiconductor optical modulator using Franz-Keldysh effect or Wannier-Stark optical modulator produces the same effect. To adjust chirp parameter α, a phase modulator inserted in series may be used or pre-chirping may be effected by directly modulating the semiconductor laser acting as a light source. If the spectrum is inverted by the four wave mixing in an optical fiber or a traveling-wave type semiconductor laser amplifier, the sign of chirp parameter α can be inverted.

What is claimed is:

1. An optical transmission system comprising:
    an optical transmitter for transmitting an optical signal, comprising:
        an optical modulator for modulating an intensity of the optical signal in accordance with a binary digital NRZ (nonreturn-to-zero) electric signal and outputting a transmission optical signal; and
        means for supplying the electric signal and thereby driving said optical modulator, said means including means for adjusting a waveform of the electric signal supplied to said optical modulator so that a timing with which the optical signal outputted from said optical modulator transits from a high level to a low level is later than a timing with which the optical signal transits from the low level to the high level;
    an optical fiber with wavelength dispersion for propagating the signal light transmitted from said optical transmitter; and
    an optical receiver for receiving the optical signal propagated along said optical fiber and reconstituting an electric signal from the optical signal.

2. An optical transmission system according to claim 1, wherein said adjusting means includes a timing adjusting circuit for adjusting the level transition timings.

3. An optical transmission system according to claim 2, wherein said timing adjusting circuit includes means for making adjustments so that a delay between the timings is 15% or more of a single time slot.

4. An optical transmission system according to claim 2, wherein said timing adjusting circuit includes means for making adjustments so that a delay between the timings is in range of 20% to 40% of a single time slot.

5. An optical transmission system according to claim 4, wherein if a bit rate of the optical signal transmitted from said optical transmitter is B [bits/s], an equalization bandwidth in said optical receiver will be in range of 0.8 B [Hz] to 1.3 B [Hz].

6. An optical transmission system according to claim 2, wherein an effective chirp parameter in said optical modulator is in range of −1 to 0.

7. An optical transmission system according to claim 2, wherein said timing adjusting circuit includes means for making adjustments so that a delay between the timings is in range of 15% to 40% of a single time slot.

8. An optical transmission system according to claim 2, wherein said optical receiver includes means for measuring a high-level dispersion width and low-level dispersion width of the electric signal after equalizer and before decision circuit.

9. An optical transmission system according to claim 8, wherein said timing adjusting circuit includes means for adjusting a delay between the timings according to the values of the two types of dispersion width measured at said measuring means.

10. An optical transmission system according to claim 9, wherein said timing adjusting circuit includes means for adjusting a delay between the timings so that the high-level dispersion width and low-level dispersion width of the electric signal after equalizer and before decision circuit in said optical receiver are equal to each other.

11. An optical transmission module comprising:

an optical modulator for modulating an intensity of an optical signal in accordance with a binary digital NRZ (nonreturn-to-zero) electric signal; and a driving circuit for supplying the electric signal and thereby driving said optical modulator, said driving circuit including a timing adjusting circuit for adjusting a waveform of the electric signal supplied to said optical modulator so that a timing with which the optical signal outputted from said optical modulator transits from a high level to a low level is later than a timing with which the optical signal transits from the low level to the high level.

12. An optical transmission module according to claim 11, wherein said timing adjusting circuit includes means for making adjustments so that a delay between the timings is 15% or more of a single time slot.

13. An optical transmission module according to claim 11, wherein said module is provided with an input terminal for inputting a control signal to control a delay between the timings to said timing adjusting circuit.

14. An optical modulator for modulating the intensity of an optical signal in accordance with a binary digital NRZ (nonreturn-to-zero) electric signal, wherein a working wavelength, bias voltage, and modulation voltage amplitude of said optical modulator are set so that an extinction ratio of said optical modulator is 10 dB or more, and a timing with which the optical signal outputted from said optical modulator transits from a high level to a low level is later than a timing with which the optical signal transits from the low level to the high level.

15. An optical modulator according to claim 14, characterized in that a delay between the timings is 15% or more of a single time slot.

16. An optical modulator according to claim 14, characterized in that a delay between the timings is in range of 20% to 40% of a single time slot.

17. An optical modulator according to claim 14, characterized in that the working wavelength, bias voltage, and modulation voltage amplitude are set so that an equivalent chirp parameter in said optical modulator is in range of 0 to −1.

18. An optical modulator according to claim 14, characterized in that the working wavelength, bias voltage, and modulation voltage amplitude are set so that an equivalent chirp parameter in said optical modulator is in range of +2 to +3.5.

19. A method of driving an optical modulator for modulating the intensity of an optical signal in accordance with a binary digital NRZ (nonreturn-to-zero) electrical signal comprising the steps of:

setting a working wavelength, bias voltage, and modulation voltage amplitude of said optical modulator so that an extinction ratio of said optical modulator is 10 dB or more; and supplying said electric signal to said optical modulator after modifying a waveform of said electric signal so that a timing with which the optical signal outputted from said optical modulator transits from a high level to a low level is delayed compared with a timing with which the optical signal transits from the low level to the high level.

* * * * *